United States Patent [19]

Boynton

[11] 4,089,339
[45] May 16, 1978

[54] SOLVENT CLEANING SYSTEM

[75] Inventor: Kenneth G. Boynton, Milford, N.H.

[73] Assignee: Hollis Engineering, Inc., Nashua, N.H.

[21] Appl. No.: 630,280

[22] Filed: Nov. 10, 1975

Related U.S. Application Data

[62] Division of Ser. No. 505,317, Sep. 12, 1974, Pat. No. 3,968,013.

[51] Int. Cl.² ............................................. B08B 3/04
[52] U.S. Cl. ...................................... 134/73; 134/107
[58] Field of Search ................................... 134/72–73, 134/82–83, 105, 107–108, 133–134; 34/9; 198/174, 198; 202/170, 170 D; 209/172, 172.5, 173, 464

[56] References Cited

U.S. PATENT DOCUMENTS

| 581,036 | 4/1897 | Pike | 209/500 X |
|---|---|---|---|
| 784,504 | 3/1905 | Rubin | 134/72 X |
| 1,019,111 | 3/1912 | Wright | 134/73 |
| 1,421,055 | 6/1922 | Adams | 134/82 |
| 1,583,035 | 5/1926 | Valerius et al. | 198/173 |
| 1,735,534 | 11/1929 | Eggenweiler et al. | 118/423 X |
| 2,321,397 | 6/1943 | Koch | 118/423 |
| 2,385,860 | 10/1945 | Jesson | 202/170 X |
| 2,491,912 | 12/1949 | Walker | 209/283 |
| 3,028,962 | 4/1962 | Davis | 209/172.5 |
| 3,362,078 | 1/1968 | Kamper et al. | 34/9 |

Primary Examiner—Robert L. Bleutge
Attorney, Agent, or Firm—Schiller & Padiscio

[57] ABSTRACT

Apparatus adapted for cleaning or degreasing work pieces by contacting with an organic degreasing agent such as a halogenated hydrocarbon. The work pieces are moved in and out of contact with the degreasing agent and are supported on an array of substantially parallel, spaced, elongate members, in fixed position. Means are included for moving the work pieces across the top surface of the array in the direction of elongation of the members.

8 Claims, 7 Drawing Figures

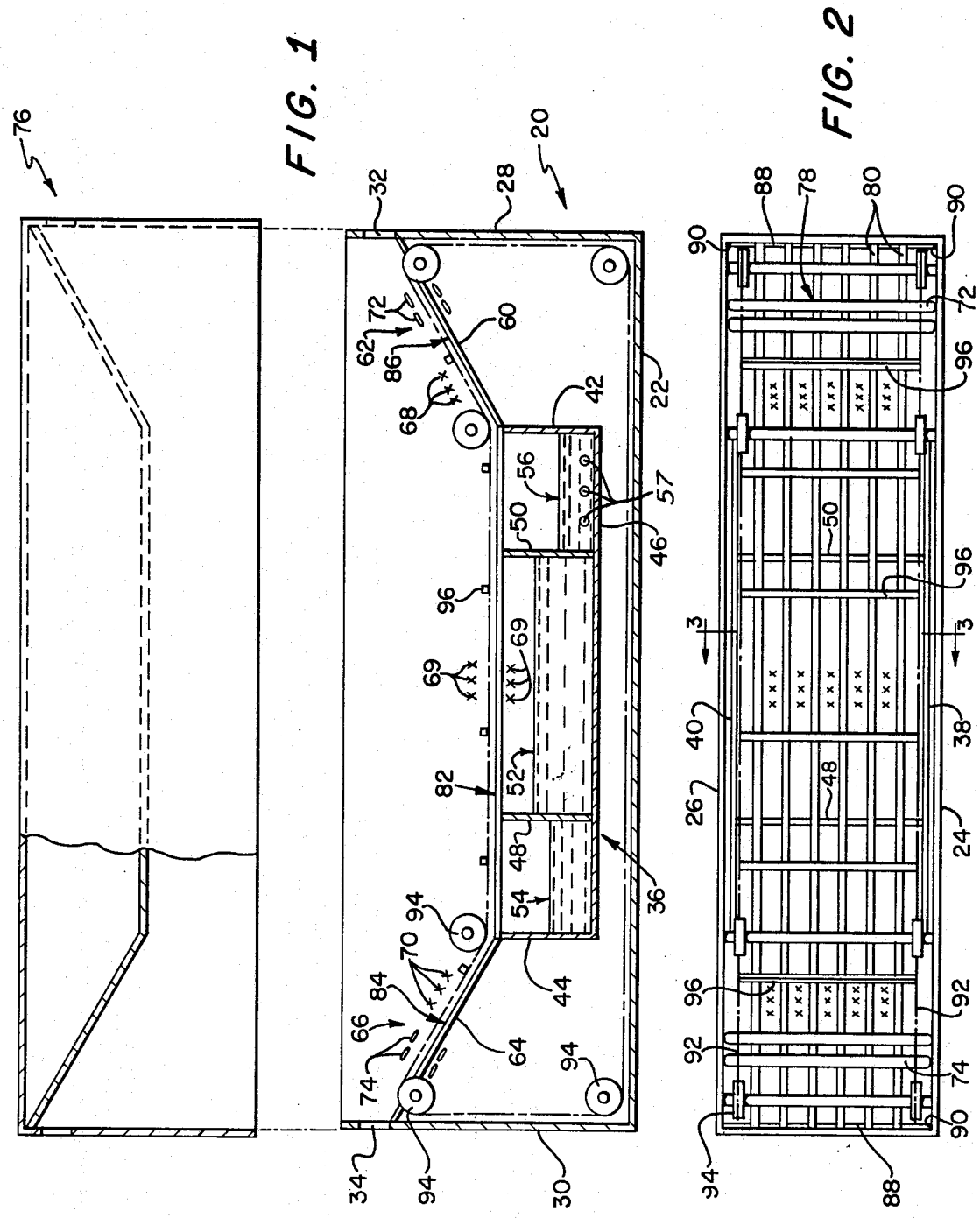

SOLVENT CLEANING SYSTEM

This application is a division of our copending application Ser. No. 505,317, filed Sept. 12, 1974 for Solvent Cleaning System, now U.S. Pat. No. 3,968,013.

This invention is concerned with cleaning devices and particularly with a novel and improved degreasing apparatus including a conveyor having a stationary support grating and moving flights for driving work pieces along the grating.

Solvent cleaning or degreasing systems are well known in the art. In simplest form a solvent degreasing system includes a pot or trough for containing a body of a liquid organic degreasing agent or solvent, e.g. a relatively volatile hydrocarbon or halogenated hydrocarbon, means for heating the degreasing agent, typically to boiling, a condenser for limiting the vapor level of the degreasing agent in the system, and means for moving a work piece through the system in and out of contact with the solvent vapor and/or body of liquid solvent. The handling and transportation of work pieces through solvent cleaning systems of this type has presented some problems. For example, it is known that the work pieces can be supported and transported through the cleaning system on an endless belt conveyor. While endless belt conveyors may provide a means for handling a large number of work pieces of varying size and shape, and are thus particularly suitable for in-line automatic manufacturing, a disadvantage of this type of conveyor is that a certain amount of solvent vapors are dragged-out by the moving belt past the condenser, and escape to the surrounding atmosphere. This results in the loss of solvent which may substantially increase production costs. Also, the evaporation of certain solvents may be prohibited as a violation of "clean air" regulations or may be hazardous, thus may require extensive equipment for solvent recovery and/or scrubbing. Additionally, drainage may be relatively poor from the belt which may result in additional solvent loss and may also increase drying time for the work-pieces.

Other prior art degreasing systems may utilize a so-called "finger conveyor" to move the work pieces through the apparatus in and out of contact with the solvent. A typical finger conveyor comprises a pair of cooperating conveyor chain assemblies having fingers or brackets appended thereto. In such systems the work pieces are engaged by the fingers or brackets and supported by the brackets between the chain assemblies. While systems of this type may substantially reduce the amount of solvent drag-out, such systems have other disadvantages. For one, means must be provided for adjusting the width of the conveyor assemblies to accommodate different width work-pieces. Also, the work pieces that can be conveyed on such assemblies are substantially limited to those which by their shape will cooperate with the brackets or fingers. Furthermore, such assemblies typically require exact feed control to position the work pieces on the supporting fingers or brackets, and also special means for unloading the work pieces at the other end of the conveyor.

Still other prior art degreasing systems may utilize suspended baskets or the like to convey the work pieces in and out of contact with the solvent. While these latter systems may also reduce somewhat the problem of solvent drag-out, they present additional problems in loading and unloading the baskets.

It is thus an object of the present invention to provide a novel and improved degreasing system which includes means for conveying the work pieces in and out of contact with the degreasing agent or solvent which produces a minimum of solvent drag-out; and, to provide a degreasing system of the type above described which is adapted to handle work pieces of a variety of size and shape.

Important considerations in the design and operation of solvent degreasing systems include: Minimum of solvent loss; the ability to accommodate various size and shape work pieces; and, ease of loading and unloading work pieces.

The solution to these problems and others is achieved by providing in a solvent degreasing system, means for moving the work pieces in and out of contact with the solvent vapors and/or body of liquid solvent comprising an array of substantially parallel, spaced, elongated members having a central portion depressed with respect to its end portions. The array is located in fixed position relative to the system so that its central portion is below the level of the solvent vapor (and, if desired, below the surface of the body of liquid solvent), and its end portions are above the surface of the body of liquid solvent, and also above the level of the solvent vapor. Finally, means are provided for moving the work pieces across the top surface of the array in the direction of elongation of the members.

Other objects of the invention will, in part, be obvious and will, in part, appear hereinafter.

The invention accordingly comprises the apparatus possessing the construction, combination of elements and arrangement of parts, which are exemplified in the following detailed description, and the scope of application of which will be indicated in the claims.

For a fuller understanding of the nature and objects of the present invention, reference should be made to the following detailed description taken in connection with the accompanying drawings in which like numerals depict like parts and wherein:

FIG. 1 is a fragmentary, side elevational view of a degreasing system embodying the invention;

FIG. 2 is a plan view, partly in section, of the degreasing system of FIG. 1;

Figure 3:
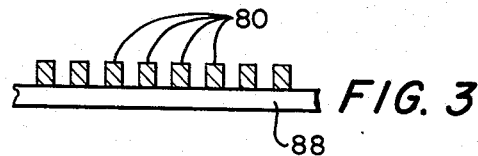
FIG. 3 is a cross-sectional view of the degreasing cleaning system of FIG. 1, taken along line 3—3.

Referring now to FIGS. 1, 2 and 3 of the drawings, wherein there is illustrated one embodiment of solvent degreasing system embodying the present invention, in the form of a vapor degreaser. The degreasing system is illustrated in the form of a rectangular enclosure 20 with a horizontal bottom wall 22, vertical front and back walls 24 and 26, respectively, and vertical end walls 28 and 30, which include openings 32 and 34 adjacent their top ends. Disposed within enclosure 20 at a level below openings 32 and 34 is an elongate trough comprising solvent tank 36 having side walls 38 and 40, end walls 42 and 44 and a bottom wall 46. Tank 36 is adapted to contain a supply of an organic cleaning liquid or degreasing solvent. Various degreasing solvents are known in the art and are suitable for use in the present invention. Among such solvents may be mentioned chlorinated hydrocarbons such as carbon tetrachloride, chlorethylene, trichlorethylene, methylene chloride, certain of the fluorinated hydrocarbons such as tetrachlorodifluoroethane, trichloromonofluoromethane, trichlorotrifluoroethane, benzene, toluene, naphthalene, and mixtures of one or more of these solvents.

A pair of spaced partitions 48 and 50 extending from bottom wall 46 between side walls 38 and 40, divide tank 36 into three compartments or sections: a main reservoir section 52, a distillate section 54 and a boiling section 56. Heating means such as coils 57 are disposed within boiling section 56 and are adapted to heat the solvent therein to the solvent boiling point. Tank sections 52, 54 and 56 are interconnected by suitable overflow means (not shown); also included are means (not shown) for adding fresh solvent make-up into the system whereby desired solvent levels may be maintained in the various tank sections in a manner well known in the art.

Extending downwardly from the bottom edge of opening 32 to the top edge of tank wall 42 is a sloping partition 60 defining an entrance compartment indicated generally at 62 through which work pieces can be introduced into the cleaning system. Another partition 64 extending upwardly from the top edge of tank wall 44 to the bottom edge of opening 34 defines an exit compartment indicated generally at 66, through which work pieces can be removed from the cleaning system. Spray means 68 and 70 are provided adjacent the lower ends of entrance and exit compartments 62 and 66 respectively, for directing a spray of liquid solvent onto the work pieces as the latter are moved into and out of the cleaning system as will be described in detail hereinafter. Spray means 69 is provided adjacent tank main reservoir section 52. Liquid solvent for spray means 68 and 69 is withdrawn from tank main reservoir section 52, and pumped under pressure through the spray means in a manner well known in the art. Similarly, clean liquid solvent for spray means 70 is withdrawn from tank distillate section 54, and pumped under pressure through the spray means.

As is usual in solvent cleaning systems, the entrance and exit compartments 62 and 66 include condensers 72 and 74 for limiting the vapor level therein, and to reduce the amount of solvent evaporation loss. The condensers typically are water cooled heat exchanger tubes as are well known in the art. Preferably the condensers are operated at an exit temperature at least 50° F below the boiling point of the solvent.

For example, where the solvent is 1-1-1 trichloroethane (b.p. 165° F), the solvent may be heated in the boiling tank, section 56 to the boiling point, while the exchanger tubes in condensers 72 and 74 may be cooled so that they have outlet temperatures of about 115° F.

Enclosure 20 also includes a cover 76 which may be substantially flat, but preferably is shaped as shown in FIG. 1 to reduce the free head space above tank 36, and also to reduce the free head space in entrance and exit compartments 62 and 66. As a result accummulation of solvent vapor within the apparatus may be reduced.

An important requirement and advantage of the present invention is to provide means for transporting the work pieces through the cleaning apparatus in and out of contact with the solvent and/or solvent vapor under conditions whereby a minimum amount of solvet escapes from the system, i.e. by dragout. The present invention achieves this by the provision of a specially designed transporting means which has a minimum surface area moving through the solvent and/or solvent vapor.

Referring in particular to FIGS. 1-3 of the drawing wherein there is illustrated one embodiment of transporting means for use in the invention in a degreasing system of the solvent vapor type. The transporting means comprises a stationary support grating generally designated 78. Support grating 78 comprises an array of elongated, substantially parallel, spaced members 80. The spaced members are substantially identical to each other, and each includes a central portion 82 which is depressed with respect to its end portions 84 and 86. Elongated members 80 are disposed so as to provide common, substantially plane surfaces at sections 82, 84 and 86, respectively. Members 80 are joined as a unit by a multiplicity of connecting members 88 to form a rigid open structure. Connecting members 88 may be formed integrally with elongated members 80, or the connecting members may comprise separate elements joined to the members 80. Preferably the connecting members 88 join members 80 adjacent their lower edges so as to provide a strong, rigid, open grating having elongated spaces between elongated members 80, in which the spaces between the elongated members 80 are unobstructed for a distance adjacent the top surface edge of the members.

Elongated members 80 may take on a number of different configurations. For example, elongated members 80 may have a relatively deep, thin, rectangular cross-sectional configuration, e.g. as shown in FIG. 3. Alternatively, members 80 may be formed with surfaces converging to a linear ridge or sharp edge as shown by members 80A and 88A in FIG. 6A. The latter configuration obviously provides a minimum contact area and maximum drip or drainage area and is especially suitable when used to support articles and materials requiring minimum contact area, e.g. as for example relatively large, rigid articles having a flat surface such as a printed circuit board. Still another alternative is shown by members 89B and 88B in FIG. 6B wherein elongate members 80 are in the form of elongate rods. It should be noted that this latter embodiment may be particularly convenient to manufacture.

The spacing between elongated members 80 may vary over a wide range depending on the size and shape of the objects to be conveyed. For example, members 80 may be spaced apart in an amount in the range of about ¼ to 1 inch which provides a grating which is useful for supporting articles of a large variety of size and shape, and also provides good drainage.

Connecting members 88 function to maintain the spacing between elongated members 80 and additionally provide means for locating the members in a fixed position in the cleaning apparatus, e.g. as at 90, so that the central portion 82 of the array is below the level of solvent vapor and the end portions 84 and 86 are above the level of solvent vapor.

Figure 6A:
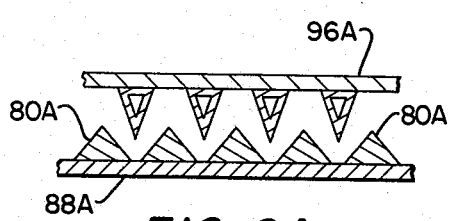
FIG. 6 (A and B) is a series of cross-sectional views showing additional embodiments of portions of conveyors incorporating principals of the present invention.
Figure 6B:
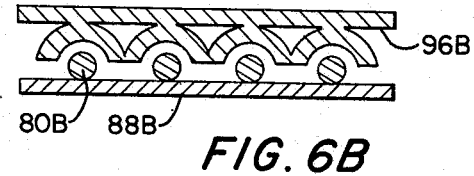

The transporting means also includes means for moving the work pieces across the top surface of the array in the direction of elongation of the members. Referring to FIGS. 1 and 2 the transporting means includes a pair of spaced endless driven chains 92, supported on a system of suitably positioned sprockets 94 of which one or more of the sprockets is driven, as by a motor (not shown). The driven chains 92 substantially follow the top contour of the support grating 78 for a portion of their lengths. Suitably spaced horizontal flights 96 in the form of elongate bars span the chains and are disposed substantially transverse to the long dimension of the spaced members 80. Flights 96 are positioned so as to pass along the surface of members 80. If desired, flights 96 may be contoured so as to also fit into the spaces between elongate members 80 e.g. as shown at 96A and 96B (FIGS. 6A and 6B). Also if desired, flights 96 may be formed in an open or perforate structure such as shown at 96A in FIG. 6A, and at 96B in FIG. 6B so as to facilitate drainage therefrom.

In operation, work pieces fed into the cleaning apparatus through opening 32 are supported on grating 78 and moved along the top surface of grating 78 in the direction of elongation of members 80 by flights 96, through the cleaning apparatus under spray means 68, 69 and 70, and through the solvent vapors above the solvent tank 36. One skilled in the art will recognize that the work transporting means used in the apparatus of the present invention as above described has relatively few moving parts, and the major portion of the transporting means is stationary, i.e. as compared to conventional moving conveyors. Accordingly, the amount of solvent fumes and liquid solvent dragged out on the transporting means past condenser 74 is minimal, with the result that the escape of solvent from the apparatus to the surrounding atmosphere is also substantially reduced as compared to the loss typically experienced by use of conventional moving conveyors.

Figure 4:
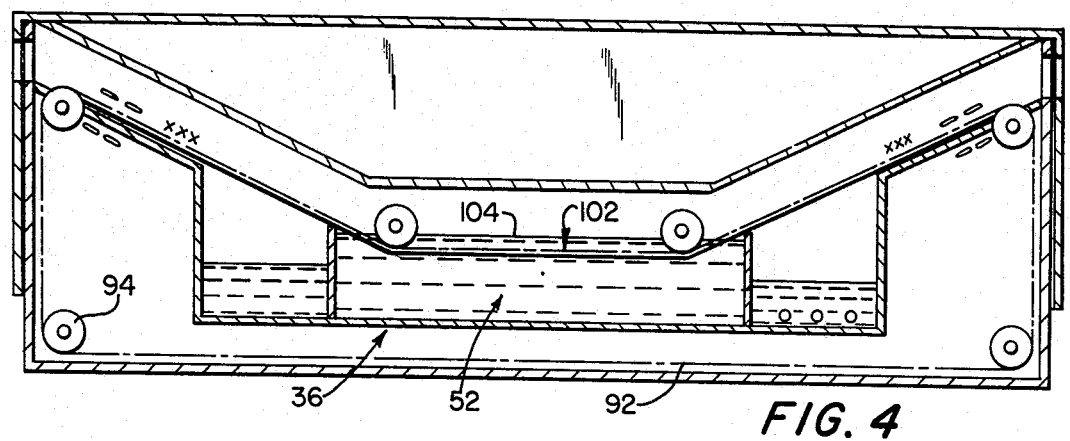
FIG. 4 is a side elevational view of a portion of an alternative form of degreasing system incorporating the principals of the present invention.

Referring to FIG. 4 wherein there is shown an alternative embodiment of degreasing system embodying the present invention, in the form of a solvent bath degreaser. The degreasing system in FIG. 4 is constructed substantially as shown in FIGS. 1-3, in which, however, the work transporting means is shaped so that its central portion 102 is disposed below the level of solvent 104 in the main resevoir section 52 of tank 36. One skilled in the art will recognize that with the latter arrangement work pieces transported through the cleaning apparatus will pass in and out of the body of liquid solvent, in addition to being subjected to solvent spray and treatment with solvent vapors.

The present invention is further described by the following experimental work which is intended to illustrate but not to limit it.

EXAMPLE I

A solvent cleaning system is constructed substantially as shown in FIGS. 1-3, in which, however, the work transporting means comprises a conventional driven belt conveyor in which the moving belt supports and moves the work pieces through the apparatus, in and out of the solvent vapor. The conveyor belt comprises a multiplicity of perforated links, joined at their ends to form an endless open mesh belt, 18 inches wide. The conveyor belt has total surface area of about 7 square feet per running foot. The conveyor is run at rate of 4 linear feet per minute.

The apparatus is charged with 55 gallons of a cleaning solvent which comprises an azeotropic mixture of 1,1,2-trichloro-1,2,2,-trifluoroethane and ethyl alcohol having a boiling point of about 112° F. The solvent is heated to boiling in tank resevoir section 56. The conveyor is turned on. Solvent is withdrawn from the tank 52 and sprayed as fine sprays onto the moving conveyor at 68 and 69; solvent is withdrawn from 54 and sprayed as a fine spray onto the moving conveyor at 70, all at constant rates. Cold water is circulated through condensers 72 and 74. The condensers have an outlet temperature of about 70° F. Ambient temperature is 80° F, ambient pressure is 760 mm Hg.

The apparatus is run under the above conditions for one hour, after which the conveyor belt is stopped, and solvent spraying and heating are discontinued. Solvent loss from the system is observed to be 0.9 gallons.

EXAMPLE II

Solvent cleaning apparatus is constructed as in Example I in which, however, the work transporting means is substantially as shown in FIGS. 1-3. Thus the apparatus includes a support grating 78 comprising a multiplicity of elongate members 80 in the form of ¼ inch diameter rods. Members 80 are spaced apart from each other on ¾ inch centers. Total width of the grating is 18 inches. The flights 96 are shaped as shown in FIG. 1, are about 19 inches wide, and are driven between a pair of ¼ inch chains. The flights are spaced apart by 18 inches. Total surface area of moving parts of the transporting means is about 0.5 square feet per running foot. The flights are driven along the grating at a speed of 4 linear feet per minute. All other conditions are as in Example I.

Solvent loss after running for one hour is found to be only about 0.4 gallons.

Figure 5:
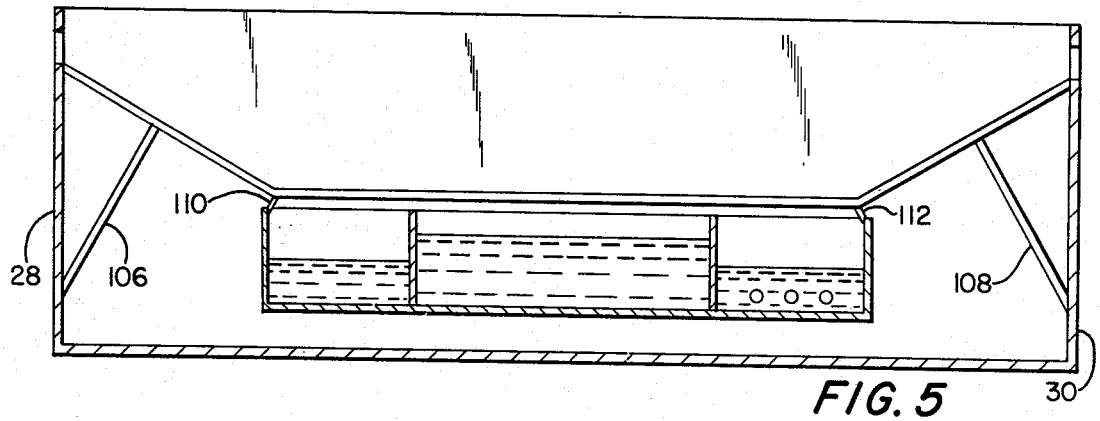
FIG. 5 is a side elevational view of a portion of an alternative form of conveyor system for use in a degreasing system incorporating the principals of the present invention.

Still other changes may be made in the above apparatus without departing from the scope of the invention herein involved. For example, the elongate members 80 comprising grating 78 may be individually supported and attached to end walls 28 and 30 of enclosure 20 and walls 48 and 50 of tank 36, e.g. as shown in FIG. 5 by brackets 106, 108, 110 and 112. Obviously, the desired spacing between the individual members 80 will also be maintained by this arrangement. In still another modification flights 96 can be suspended and driven by a single, overhead loop (not shown). This latter modification has the advantage of further reducing the total surface area of moving parts of the transporting means and may result in further reducing the amount of solvent drag-out. Other changes will be apparent to one skilled in the art.

I claim:

1. In a system for cleaning work pieces with an organic solvent, and having a tank for containing a liquid body of said solvent, means disposed in said tank for heating at least a portion of said solvent to a predetermined temperature whereby to generate a quantity of solvent vapor above said tank, and means disposed above said tank for limiting the level of solvent vapor above said tank, the improvement comprising:

means for moving said work pieces in and out of said body of solvent and said solvent vapor and comprising an array of substantially parallel, spaced, elongated members each having a central portion depressed with respect to its end portions, said elongated members extending through and between said end portions, at least one intermediate section rigidly joining said elongated members so as to preserve the parallel relationship of said elongated members, means for supporting said array in a fixed position relative to said tank and frame so that said central portion of said array is located so as to be below the surface of said body of solvent and said end portions thereof are disposed to be above said body of solvent; said work pieces being supported soley by said array of parrallel members and drive means for sliding said work pieces on and across the top surface of said array in the direction of elongation of said members.

2. In a system according to claim 1 wherein said means for moving said work pieces comprises elongated endless loop means supporting a plurality of flights transverse to the direction of elongation of said loop means and said elongated members and positioned adjacent the top surface of said array, and means for permitting said loop means to be driven so that said flights are driven adjacent the top surface of said array in the direction of and parallel to the elongation of said members.

3. In a system according to claim 2 wherein said loop means comprises a pair of transversely spaced and parallel endless driven chains, and including a plurality of spaced flights spanning said chains.

4. In a system according to claim 1 further including means for directing a stream of liquid solvent onto said work pieces adjacent said end portions of said elongated members.

5. In a system according to claim 1 wherein said intermediate sections join said elongate members adjacent the lower portions of said elongated members so as to provide an open grating having elongated spaces between said elongated members which spaces are unobstructed in the direction of elongation and for a portion of the vertical distance between the lower and upper edges of said members.

6. In a system according to claim 5 wherein said elongated members have generally rectangular cross sections and said flights are contoured so as to extend into said unobstructed spaces.

7. In a system according to claim 5 wherein said elongated members are formed with their top surfaces converging to a linear ridge, and said flights are contoured so as to extend into said unobstructed spaces.

8. In a system as defined in claim 5 wherein said elongated members are shaped substantially as elongate rods, and said flights are contoured so as to extend into said unobstructed spaces.

* * * * *